United States Patent [19]

Zagdoun et al.

[11] Patent Number: 5,244,692
[45] Date of Patent: Sep. 14, 1993

[54] PROCESS FOR FORMATION OF AN ALUMINUM OXIDE-BASED LAYER ON GLASS, THE PRODUCT THUS OBTAINED, AND ITS USE IN WINDOWS INCORPORATING A CONDUCTIVE LAYER

[75] Inventors: Georges Zagdoun, La Garenne Colombes; Maurice Trouve, Nemours; Jean Pegouret, Paris, all of France

[73] Assignee: Saint-Gobain Vitrage International, Aubervilliers Cedex, France

[21] Appl. No.: 803,446

[22] Filed: Dec. 6, 1991

[30] Foreign Application Priority Data

Dec. 6, 1990 [FR] France ................... 90 15277

[51] Int. Cl.$^5$ ............... B05D 5/12; B05D 1/12; B05D 1/36
[52] U.S. Cl. .................. 427/126.3; 427/110; 427/126.2; 427/126.4; 427/180; 427/190; 427/226; 427/419.3; 427/421
[58] Field of Search ............... 427/126.2, 126.3, 126.4, 427/110, 190, 180, 168, 419.3, 421, 226, 255; 65/60.2, 60.52

[56] References Cited

U.S. PATENT DOCUMENTS

| | | | |
|---|---|---|---|
| 4,129,434 | 12/1978 | Plumat et al. | 65/60.52 |
| 4,160,061 | 7/1979 | Okino et al. | 427/226 |
| 4,349,370 | 9/1982 | Terneu | 427/168 |
| 4,547,400 | 10/1985 | Middleton et al. | 65/60.2 |
| 4,562,095 | 12/1985 | Coulon et al. | 427/180 |

FOREIGN PATENT DOCUMENTS

| | | |
|---|---|---|
| 0041010 | 12/1981 | European Pat. Off. |
| 0192009 | 8/1986 | European Pat. Off. |
| 2317241 | 2/1977 | France |
| 950533 | 2/1964 | United Kingdom |

*Primary Examiner*—Shrive Beck
*Assistant Examiner*—David M. Maiorana
*Attorney, Agent, or Firm*—Oblon, Spivak, McClelland, Maier & Neustadt

[57] ABSTRACT

A process consisting of forming, by pyrolysis of powders on glass heated to a high temperature, a layer of aluminum oxide and of at least one zinc, indium, tin, or titanium oxide, using a mixture of powders formed from an organometallic aluminum derivative containing at least one alcoholate function and one $\beta$-diketone function, and at least one organometallic tin, indium, zinc, and titanium compound, and windows incorporating this oxide-coated glass having a conductive layer and a neutral color under reflection.

17 Claims, No Drawings

PROCESS FOR FORMATION OF AN ALUMINUM OXIDE-BASED LAYER ON GLASS, THE PRODUCT THUS OBTAINED, AND ITS USE IN WINDOWS INCORPORATING A CONDUCTIVE LAYER

The present invention concerns a process for forming an aluminum oxide-based layer on a glass supporting base. It concerns, in particular, a layer of aluminum oxide associated with another oxide, including zinc oxide, tin oxide, titanium oxide, and/or indium oxide. It further concerns glass bearing this layer and its use, in particular, in windows incorporating a thin, transparent conductive layer of metallic oxide and which can be used in buildings and automobiles.

Windows designed for buildings are advantageously made of clear silico-sodic-calcic glass which possesses high light- and energy-transmission factors, e.g., approaching 90% when the thickness is 4 mm. To improve user comfort, especially in winter, by reducing the energy loss due to leakage of calories from the inside to the outside of the building, conventional practice calls for making a window by coating one surface of a glass sheet with a conductive layer of metallic oxide, termed a low-emissivity oxide, which increases the rate of reflection of the window in the infrared range. A glass window coated with a layer of this kind may be combined with another glass sheet, thus enclosing an air space between them and thereby producing a double-insulation window.

Windows incorporating transparent coatings and exhibiting low-emissivity properties are well known. They may be made, for example, from a glass supporting base and a thin layer of metallic oxide, such as a layer of tin oxide doped, for example, with fluorine, or a layer of indium oxide doped with tin (ITO).

These layers may be obtained using different processes in a vacuum (thermal evaporation, cathodic spraying) or by pyrolysis of metallic compounds in solution, powder, or vapor form which are sprayed on the substrate heated to high temperature. In this case, when striking the glass heated to high temperature, the compounds decompose and oxidize so as to form a metallic oxide coating.

The layers, such as a layer of tin oxide doped with fluorine or an ITO layer, have properties that allow them to be used satisfactorily in low-emissivity windows.

The optical and electrical properties of these layers allow them to be used to form automobile windows, for example heated windows, e.g., windshields, and as substrates in special products, such as optoelectronic devices like photovoltaic cells and liquid crystal display devices.

However, at the thicknesses required to obtain advantageous electronic properties, the layers become colored under reflection. Thus, layers of tin oxide doped with fluorine and ITO layers having a thickness of 180 nm, become blue under reflection, and those having a thickness of 360 nm, green.

This color may not be pleasing or may not be adapted to the projected use. Furthermore, slight variations of thickness of the layers cause color irregularities (iridescence).

To eliminate or reduce this coloration under reflection or these iridescences, it has been proposed that a layer termed intermediate, or sub-layer, be placed on the glass substrate before forming the conductive layer. The geometrical thickness and refraction index of this intermediate layer are such that the combination of the intermediate and conductive layers forms a structure having neutral color under reflection.

The refraction index is adjusted by mixing an oxide possessing a low refraction index, such as $Al_2O_3$ (n=1.65) with an oxide having a high refraction index, such as $TiO_2$, $SnO_2$, $In_2O_3$ and $ZnO$.

These intermediate layers having specific refraction indices and geometric thicknesses make it possible to eliminate or reduce substantially the color observed when the conductive layer is under reflection. As regards iridescences, although they are appreciably reduced by the presence of this intermediate layer, they may, however, still be seen as approximately parallel bands whose spacing is certainly wider than when the product comprises no intermediate layer between the glass substrate and the conductive layer, but which are, nevertheless, not suitable for a high-quality product.

It is known how to form these layers by pyrolysis of metallic compounds sprayed on the glass substrate heated to high temperature, using a solution in organic solvents.

However, the use of organic solvents poses problems, in particular pollution.

To avoid these problems, attempts have been made to form anti-color or anti-iridescent layers by means of pyrolysis of metallic compounds in powder form.

The object of the present invention is the formation, by pyrolysis of a powder on a glass substrate, of a thin transparent film exhibiting good adhesion to the glass, in particular an aluminum oxide-based film and especially a film formed from a mixture of an oxide having a low refraction index, such as $Al_2O_3$, and an oxide having a high refraction index, such as $SnO_2$, $ZnO$, $TiO_2$, and $In_2O_3$ and which can function as an intermediate layer between the glass substrate and a transparent layer of metallic oxide, especially a conductive layer, in order to form a product which does not possess the above-mentioned disadvantages, and which possesses, in particular, a neutral color under reflection and no iridescence.

Another object of the invention includes products containing a glass substrate and a thin, transparent intermediate layer such as that previously mentioned and, in addition, a transparent conductive layer, these products having transparency and electric conductivity properties suitable for forming heated windows, low-emissivity windows, substrates for optoelectronic devices, and incorporated-alarm windows.

The process according to the invention for formation of an aluminum oxide-based window consists in spraying, on a glass supporting base heated to a temperature below its melting point, at least one organic aluminum compound which decomposes thermally in contact with the hot glass and oxidizes so as to form said layer. The process is characterized by the fact that at least one compound in powder form containing an organometallic aluminum derivative having at least one alcoholate function or at least one β-diketone function is sprayed on the supporting base.

As the aluminum compound, use may be made, for example, of aluminum triisopropylate, aluminum tri-n-butylate, aluminum tri-ter-butylate, aluminum triethylate, or aluminum acetylacetonate.

The invention proposes formation of the aluminum oxide-based layer from an aluminum compound in powder form mixed with another organometallic compound in powder form suitable for forming, on the substrate, by means of pyrolysis, an oxide possessing a high refraction index, including tin, zinc, indium, or titanium oxide in order to obtain, on the glass, a mixed layer whose refraction index is intermediate between that of the aluminum oxide and that of the other oxides.

As zinc compounds in powder form that can be decomposed at the substrate temperature and are usable in the invention, mention may be made, for example, of zinc acetate and zinc acetylacetonate.

As indium compounds, mention may be made of indium acetylacetonate and indium formate. In particular, indium formate, which is suitable for the invention, is described in European Patent Applications EP-A-192 009 and EPA-A-324 664.

The tin compounds that can be used to implement the invention are organic compounds which preferably do not contain chlorine. In fact, chlorinated derivatives are known to form haze. The usable tin compounds include, for example, dibutyltin oxide (DBTO) and dibutyltin difluoride (DBTF).

As titanium compounds, methyl titanium or titanium acetylacetonate may be used.

The yield given by pyrolysis depends, in particular, on the quantities of the compounds and their granulometries.

Advantageously, the aluminum compound is formed from powder having a granulometry $d_{90}$ of less than 12 $\mu$m, with $d_{90}$ ranging between 12 and 0.1 $\mu$m. As is well known, the term "$d_{90}$" signifies that 90% of the particles have a diameter less than the indicated value. This granulometry for the aluminum compound proves advantageous, since the powder has good pourability, which allows it to be used in a pyrolysis process employing powder.

The tin compounds preferably have a granulometry such that $d_{90}$ is less than 21 $\mu$m, and even 20 $\mu$m, with $d_{90}$ ranging between 21 and 0.1 $\mu$m.

As regards the indium and zinc compounds, their granulometry is preferably such that their $d_{90}$ is less than approximately 21 $\mu$m, with $d_{90}$ ranging between 21 and 0.1 $\mu$m.

The mixture of powders suitable for forming the layer according to the invention by means of pyrolysis advantageously contains from 20 to 90% of the aluminum compound and from 10 to 80% of a compound of the other metals.

In particular, to form the layer of $Al_2O_3$—$SnO_2$, use is preferably made of from 40 to 90% by weight of an aluminum compound and from 10 to 60% by weight of the tin compound.

To form the layer of $Al_2O_3$—$SnO_2$, the mixture advantageously contains from 40 to 60% by weight of zinc compound.

For a layer of $Al_2O_3$—$SnO_2$, a mixture of powders containing from 25% to 40% of an indium compound may be advantageously used.

By monitoring the quantity of the metallic compounds of the powder mixture, the refraction index of the final layer may be adjusted in terms of the desired use. Layers having a refraction index of between 1.70 and 1.85 may thus be obtained.

The presence of special compounds according to the invention makes it possible to obtain, on the glass substrate, by pyrolysis of powder, a layer which adheres wells to glass, is homogeneous, and has a very uniform thickness. According to the invention, layers having a thickness of between 50 nm and 120 nm, and in particular of approximately 80 nm, may be produced.

The oxide layers obtained using the process according to the invention have, furthermore, a coefficient of absorption of low light of less than 3%.

The thin layers of oxides according to the invention may be obtained under industrial manufacturing conditions for glass substrates. This constitutes a major advantage. In fact, glasses which incorporate a transparent, semi-conductive coating of metallic oxide and which are used for forming windows such as those previously mentioned, are advantageously manufactured industrially on the glass production line itself.

In the case of "float" glass, the strip of glass moves at run speeds that may vary between 3 and 25 m/mn. Processes for formation of these layers and devices for the implementation of these processes have been perfected in order to make it possible to produce the desired semi-conductive metallic oxide layers on glass moving at these speeds. The sub-layers possessing specific thicknesses and refraction indices, which are designed to form, in conjunction with the semi-conductive layer, a structure having a neutral color under reflection and without iridescence, must thus be able to be formed on the glass production line, i.e., by taking into account the run speed of the glass strip, its temperature, and the devices normally used to form semi-conductive metallic oxide layers.

The substrate may be formed from a silico-sodic-calcic glass used for automobile windows and buildings. This may be a clear, i.e., non-colored, glass possessing a high light-transmission capability, e.g., greater than 90% at a thickness of 4 mm. The glass may also be colored as a single batch and capable of providing increased comfort in summer for passengers in the vehicle or premises equipped with such glass, because of its reduced energy transmission. Generally speaking, for automobile windows, for example, the glass forming the substrate is chosen so as to observe regulations, i.e., a glass/layer assembly having a light transmission (LT) of at least 75% or 70%, depending on the laws in effect.

As the colored glass, use may be made of the glass called "TSA" containing $Fe_2O_3$ in proportions by weight of approximately 0.55 to 0.62%, FeO accounting for approximately 0.11 to 0.16%, thereby giving an $Fe^{2+}/Fe^{3+}$ of approximately 0.19 to 0.25, and CoO in a proportion of less than 12 ppm, and preferably even of less than 10 ppm.

For a thickness of 3.85 mm, for example, the resulting properties include a high luminous transmission ($T_L$) approaching 78% (D65 illuminant) and a relatively low energy transmission factor ($T_E$) of approximately 60, thereby giving a $T_L/T_E$ ratio of approximately 1.30.

As a colored glass, use may also be made, especially when the laws require a luminous transmission of only 70%, of a glass slightly more colored than "TSA", but which possesses, on the other hand, a slightly lower luminous transmission, i.e., a glass called "$TSA^{2+}$."

This "$TSA^{2+}$" glass is colored with the same oxides as those previously mentioned, but in slight different proportions.

Thus, the proportions of metallic oxides are as follows:

$Fe_2O_3$: between approximately 0.75 and 0.90%;
FeO: between approximately 0.15 and 0.22%; i.e., $Fe^{2+}/Fe^{3+}$ = approximately 0.20;
CoO: less than 17 ppm, and preferably even less than 10 ppm.

Consequently, this "TSA$^{2+}$" glass, 3.85 mm thick, takes on the following properties:

$T_L$: approximately 72%
$T_E$: approximately 50%, thereby giving a $T_L/T_E$ ratio of approximately 1.40 or 1.50.

The Al$_2$O$_3$—SnO$_2$, Al$_2$O$_3$—TiO$_2$, Al$_2$O$_3$—ZnO, and Al$_2$O$_3$—In$_2$O$_3$ layers produced according to the invention are particularly effective in products containing a glass substrate and a thin, transparent semi-conductive layer of metallic oxide, in order to form heated or low-emissivity transparent windows. The oxide layers according to the invention thus become sub-layers, acting as a layer, termed the anti-color layer, which forms, in conjunction with the semi-conductive layer, a structure that is neutrally colored under reflection and exhibits no colored iridescences or undulations.

The Al$_2$O$_3$—SnO$_2$, Al$_2$O$_3$—TiO$_2$, Al$_2$O$_3$—ZnO, and Al$_2$O$_3$—In$_2$O$_3$ layers according to the invention may be coated with various semi-conductive layers. These layers may, in particular, be layers of tin oxide doped with fluorine (SnO$_2$: F) or layers of indium oxide doped with tin (ITO); or, yet again, layers of zinc oxide doped with indium or aluminum, as previously indicated.

The layers of SnO$_2$: F and ITO may be advantageously obtained by pyrolysis of powders. Thus, layers of tin oxide doped with fluorine may be produced from dibutyltin oxide (DBTO) in powder form and from gaseous anhydrous hydrofluoric acid, as described in French Patent No. 2 380 997, or possibly from dibutyltin difluoride (DBTF) in a mixture with DBTO, as described in Patent No. EP-A 178 956 or EP-A-039 256. As regards the layers of ITO, they may be obtained, for example from indium formate and a tin compound such as DBTO, as described in Patent No. EP A-192 009.

The semi-conductive layers of SnO$_2$: F may also be obtained by pyrolysis in the gaseous phase, in particular from a mixture of tin compounds, such as (CH$_3$)$_3$, SnCl$_2$, (C$_4$H$_9$)$_2$ SnCl$_2$, Sn(C$_2$H$_5$)$_4$, and from organofluorine-containing compounds, such as CCl$_2$F$_2$, CHClF$_2$, and CH$_3$CHF$_2$, as described in Patent No. EP-A-027 403, or, yet again, from monobutyltrichlorotin and a compound corresponding to formula x CHF$_2$, such as chlorodifluoromethane, as mentioned in Patent EP-A-121 459.

The layers of zinc oxide doped with indium or aluminum may be obtained by pyrolysis in the vapor phase, using diethylzinc or zinc acetate and triethylindium, indium chloride, or triethylaluminum, or aluminum chloride, as described in Patent Application No. EP-A-385 769.

The layers of SnO$_2$: F may also be obtained in the liquid phase using tin acetylacetonate or dimethyltin-2-propionate in suitable organic solvents, as described in French Patent No. 2 211 411.

The use of layers of oxides according to the invention having a thickness of between 80 nm and 120 nm in conjunction with a semi-conductive layer of metallic oxide, such as that previously mentioned and having an interferential thickness (100 to 800 nm) makes it possible to produce a structure which is neutrally colored under reflection and which exhibits no iridescences or undulations such as those previously described and which, in consequence, may be effective in the formation of heated windows, especially for automobiles, or low-emissivity windows, especially for buildings. In particular, when the semi-conductive layer of low-emissivity windows is formed from a layer of SnO$_2$: F, these windows have an emissivity of less than, or equal to, 0.25 for a thickness of the semi-conductive layer which is greater than, or equal to, 300 nm.

As is well known, the optical neutrality under reflection of the structure made of a sub-layer of Al$_2$O$_3$—SnO$_2$, Al$_2$O$_3$—TiO$_2$, Al$_2$O$_3$—ZnO, and Al$_2$O$_3$—In$_2$O$_3$ and the semi-conductive layer depends on the refraction index and the geometrical thickness of the sub-layer.

The optical neutrality under reflection is determined by the dominant wavelength under reflection and by its purity.

The dominant wavelength, measured by spectrophotometry, is determined as a function of an illuminant. The D$_{65}$ illuminant is normally used for buildings and the A illuminant for automobiles.

For the invention, the lowest purity possible has been selected as a criterion for obtaining the optimal optical neutrality under reflection.

It has proved possible to obtain windows according to the invention comprising a layer of oxides according to the invention, and, in particular, a layer of Al$_2$O$_3$—SnO$_2$ and a semi-conductive layer of metallic oxide having a purity of less than 10%, and even less than 5%.

It is thought that this optical neutrality under reflection results from the homogeneous appearance of the layers of oxides produced, according to the invention, from a special mixture of specific compounds and by pyrolysis of powders.

To form the intermediate layers according to the invention on a glass substrate by pyrolysis of powders, various devices may be used, such as those described in European Patent Applications Nos. EP-A-6 064, 125 153, 130 919, 188 962, 189 709, 191 258, and 329 519.

Generally speaking, use is made of a distribution nozzle located beneath the heated glass substrate to be treated, in particular a moving glass strip such as float glass. The glass strip may move at between 3 and 25 m/mn. This nozzle comprises a cavity extending over its entire length and ends in a slot. The cavity is homogeneously fed over its entire length with a mixture of powders in suspension in a supporting gas. The powder is discharged from the slit and is pyrolized on the heated surface of the moving glass.

The temperature of the glass strip is lower than the melting point of the glass, a temperature which depends on its composition. This temperature generally ranges between 500° C. and 750° C.

The following non-restrictive examples illustrate the invention. In these examples, to produce layers according to the invention, air was used as the supporting gas. The substrate was float glass 4 mm thick, heated to a temperature of between 650° and 700°. The quantities of powders used were adjusted to ensure that the yield from pyrolysis, mentioned previously, would be the highest possible.

EXAMPLE 1

A layer of Al$_2$O$_3$—SnO$_2$ was formed using a mixture of aluminum acetylacetonate powder (90% by weight) and dibutyltin difluoride powder (10% by weight).

The glass supporting base coated with the Al$_2$O$_3$—SnO$_2$ layer was placed in a drying frame for annealing and was cut out after cooling.

The thickness and refraction index of the layer were measured by ellipsometry.

The layer had a thickness of 80–100 nm, and its refraction index was 1.70.

EXAMPLE 2

A layer of $Al_2O_3$—$SnO_2$ was formed, as in the preceding example, from a mixture of powdered dibutyltin difluoride (20% by weight) having a granulometry such that $d_{90}$ is less than 15 μm, and of powdered aluminum triisopropylate (80% by weight), having a granulometry of $d_{90} < 12$ μm.

The layer obtained had a thickness of 100–105 nm and a refraction index of $1.73 \pm 0.01$.

EXAMPLE 3

The layer was formed from a mixture of powdered dibutyltin difluoride having a granulometry such that $d_{90}$ was less than 15 μm (22% by weight) and of powdered aluminum triisopropylate having a granulometry of $d_{90} < 12$ μm (78% by weight).

The layer obtained had a thickness of 105–110 nm and a refraction index of $1.75 \pm 0.01$.

EXAMPLE 4

Using a mixture of powdered dibutyltin oxide having a granulometry of $d_{90} < 7$ μm representing 50% by weight and powdered aluminum triisopropylate having a granulometry of $d_{90} < 12$ μm, representing 50% by weight of the mixture, a layer of $Al_2O_3$—$SnO_2$ having a thickness of 100–110 nm and a refraction index of $1.75 \pm 0.01$ was formed on a glass supporting base.

EXAMPLE 5

Using a mixture of powdered dibutyltin oxide (DBTO) having a granulometry of $d_{90} < 20$ μm and powdered aluminum triisopropylate (IPA) having a granulometry of $d_{90} < 12$ μm, a layer of $Al_2O_3$—$SnO_2$ was formed.

The mixture contained 20% by weight of DBTO and 80% by weight of IPA.

A layer having a thickness of 90 nm and a refraction index of $1.73 \pm 0.01$ was formed.

The refraction index did not change after the layer was reheated at 650° C., as in Example 1.

Luminous absorption of the glass/layer structure was 1.5%.

EXAMPLE 6

Under the conditions previously specified, a layer of $Al_2O_3$—ZnO was formed on a float glass supporting base whose thickness was 4 mm, using a mixture of powdered zinc acetate ($d_{90}$ less than 21 μm) and powdered aluminum triisopropylate ($d_{90}$ less than 12 μm), in the proportions of 80% by weight of zinc acetate and 20% by weight of the aluminum compound.

The thickness of the layer was 100–105 nm and the refraction index, $1.78 \pm 0.01$.

EXAMPLE 7

A layer of $Al_2O_3$—ZnO was formed using a mixture of the powders described in Example 6 in a proportion of 60% by weight of zinc acetate and 40% by weight of aluminum triisopropylate.

The thickness of the layer was 115 nm and its refraction index, 1.76.

EXAMPLE 8

On the layer of $Al_2O_3$—$SnO_2$ obtained in Example 5 (thickness=90 nm and refraction index=$1.73 \pm 0.01$) reheated to 650° C., a layer of $SnO_2$: F was formed by pyrolysis of powdered dibutyltin difluoride (DBTF), thus giving a layer having a thickness of 360 nm. The $SnO_2$: F layer had a refraction index of approximately 2.0. Its emissivity was 0.23.

The product exhibited no iridescence.

The reflection coefficient $R_L$ of the product formed by the two layers (sub-layer of $Al_2O_3$—$SnO_2$ and layer of $SnO_22$: F) for the $D_{65}$ illuminant was measured at 12.5%.

The dominant wavelength under reflection, as determined by spectrophotometry and as a function of the $D_{65}$ illuminant (normally used for windows designed for buildings) was 475 nm, and its purity, 4.5%.

EXAMPLE 9

On the sub-layer of $Al_2O_3$—$SnO_2$ formed in Example 4 (thickness=100–110 nm and refraction index=$1.75 \pm 0.01$) reheated to 650° C., a layer of $SnO_2$ doped with fluoride ($SnO_2$: F) was formed by pyrolysis of powdered dibutyltin difluoride (DBTF), thus giving a layer of 360 nm. The layer of $SnO_2$: F had a refraction index of approximately 2.0 and an emissivity of 0.23.

The product exhibited no iridescence.

The luminous reflection coefficient was 12.5% for the $D_{65}$ illuminant.

The dominant wavelength under reflection, as determined by spectrophotometry and as a function of the $D_{65}$ illuminant, was 488 nm, and its purity, 5.8%.

EXAMPLE 10

A layer of $Al_2O_3$—$In_2O_3$ was formed from a mixture of 30% indium formate by weight ($d_{90}$ less than 21 μm) and 70% aluminum triisopropylate by weight ($d_{90}$ less than 12 μm).

The layer thus obtained had a thickness of 95 nm and a refraction index of $1.77 \pm 0.01$.

Luminous absorption was 1.80% for the $D_{65}$ illuminant.

EXAMPLE 11

A layer of $Al_2O_3$—$In_2O_3$ was formed from the same powders as those used in Example 10. The mixture contained 40% formate by weight and 60% aluminum compound by weight.

The thickness of the layer was 90 nm, and the refraction index, $1.84 \pm 0.01$.

According to the invention, the structure formed by the sub-layer of $Al_2O_3$—based oxides and the semi-conductive layer was deposited virtually simultaneously.

To this end, use was made of two nozzles, such as those described previously, positioned approximately 20 cm apart. The distance between the glass and the nozzle was approximately 10 cm. The glass was heated to a temperature of approximately 650° C. and air was used as the supporting gas.

The distance between the two nozzles was carefully determined. Indeed, if the two nozzles are positioned too close together, i.e., at a distance of less than 20 cm apart, the air and powder streams interpenetrate. If the two nozzles are two far apart, i.e., at a distance considerably greater than 20 cm, the glass cools too rapidly between the two coating operations and a layer possessing inferior properties is obtained.

In general, it is thought that the distance between the two nozzles must be twice the distance between the glass and the nozzle.

Using this two-nozzle equipment, a low-emissivity structure formed from a first layer of $Al_2O_3$—$SnO_2$ and a second layer of $SnO_2$ : F was produced.

The first nozzle was used to spray a mixture of powdered aluminum triisopropylate and of powdered dibutyltin oxide.

The second nozzle was used to spray dibutyltin difluoride (DBTF) in order to produce the layer of $SnO_2$: F.

EXAMPLE 12

To form the sub-layer of $Al_2O_3$—$SnO_2$, a mixture of 40% DBTO by weight ($d_{90}<70$ μm) and 60% aluminum triisopropylate by weight was used.

A layer having a thickness of 90+10 nm and a refraction index of 1.74±0.01 was produced.

This sub-layer was immediately coated with the layer of $SnO_2$: F by spraying dibutyltin difluoride (DBTF) on the glass supporting base. A layer 360 nm thick was obtained.

The luminous reflection coefficient of the product obtained was 12.3% for the $D_{65}$ illuminant.

The dominant wavelength under reflection was 488 nm and its purity, 4.24%.

The layer of $SnO_2$: F had an emissivity of 0.23.

EXAMPLE 13

The operating procedure used in Example 12 was repeated.

To form the sub-layer of $Al_2$—$SnO_2$, a mixture of 58% DBTO by weight ($d_{90}<7$ μm) and 42% aluminum triisopropylate by weight ($d_{90}<12$ μm) was used.

The layer obtained had a thickness of 95+10 nm and a refraction index of 1.76±0.01.

This sub-layer was immediately coated with a layer of $SnO_2$: F having a thickness of 360 nm.

The luminous reflection coefficient of the product obtained for the $D_{65}$ illuminant was 12.8%. The dominant wavelength under refection was 478 nm and its purity, 5.56%.

The layer of $SnO_2$: F had an emissivity of 0.24.

The products obtained in Examples 8, 9, 12, and 13 had a resistivity of approximately $7\times 10^{-4}$ Ω.m. These products can be advantageously used as heated windows, particularly in automobiles.

The products obtained according to the invention are chemically resistant, particularly to acids.

The chemical resistance of the glass components coated with a sub-layer of oxides according to the invention and a semi-conductive layer of $SnO_2$: F was determined by immersing samples of these glass components in a normal hydrochloric acid solution at 100° C., and also in a hydrofluoric acid solution at 20° C. prepared using 7 ml of a solution of 40% HF diluted in a liter of water.

In all cases, an incipient attack by these acids was observed after more than 30 mn, a time-limit which enables us to remark that these glass components possess excellent chemical resistance.

In the preceding example, the semi-conductive layer is formed by tin oxide doped with fluorine. Windows possessing analogous properties may be obtained by using another semi-conductive layer, e.g., a layer of indium doped with tin (ITO). A layer of this kind has the further advantage of possessing an emissivity of approximately 0.11 at a thickness of 180 nm.

Layers of $Al_2O_3$ combined with ZnO, $In_2O_3$, or $SnO_2$ have been described. It is also possible to produce, under similar conditions, layers of $Al_2O_3$—$TiO_2$ having a refraction index of between 1.70 and 1.85 and which form, with a semi-conductive over-layer, a stacked structure that is neutral under reflection.

The products containing a layer of oxides according to the invention and a semi-conductive layer, as previously described, and which exhibit no coloration proving bothersome from an aesthetic standpoint, may also be used on automobile windows, for example heated windows, and especially in windshields. They may also be used as windows incorporating an alarm.

In this case, these products may be combined with a sheet of a plastic polymer, such as polyurethane, which is placed in contact with the semi-conductive layer so as to form a laminated window incorporating a single glass supporting base. The products according to the invention may also be combined with another glass sheet by means of a sheet of a plastic material, such as polybutyravinyl, polyurethane, or vinyl polychloride, thereby forming a laminated window incorporating two glass plates.

To feed electric current to the semi-conductive layer, these windows contain power leads, such as copper foil and/or strips silkscreened with silver, arranged along the upper and lower edges of the windows. The black enamel generally deposited on these windows to conceal the power leads, in particular, is not denatured by the presence of the sub-layer.

Furthermore, the oxide layers exhibit good adhesion to the glass, thereby promoting the cohesiveness of these assemblies made up of the glass, the sub-layer, the semi-conductive layer, and the polymer sheet.

Products comprising a layer of oxides according to the invention and a semi-conductive layer, for example of $SnO_2$:F or ITO, may undergo the bending phase without difficulty, since these layers, deposited by pyrolysis, are mechanically resistant.

The layers of oxides obtained according to the invention, which are transparent and highly uniform in thickness, are also effective in non-glare windows.

A window of this kind was obtained by forming, on a glass substrate having a refraction index of 1.52, a layer of $Al_2O_3$—$SnO_2$ as obtained in Example 5. A layer having a refraction index of 1.73 and a thickness of 90 nm was obtained. The optical thickness of this layer was λ/4. In accordance with conventional practice, a layer of $TiO_2$ was formed on this layer by liquid pyrolysis, so that its optical thickness was λ/2; next, a layer of $SiO_2$, for example by means of plasma CVD, having an optical thickness of λ/4 was deposited.

The luminous reflection coefficient of the window was less than 1% per treated surface. The presence of the layer of $Al_2O_3$—$SnO_2$ makes it possible, as a result of its uniform thickness, to obtain a more homogeneous reflection coefficient over the entire product.

The layers of oxides obtained according to the invention form, furthermore, barrier layers preventing the diffusion of alkaline ions. The glass components coated with these layers may thus prove effective as substrates in optoelectronic devices, such as liquid-crystal display devices, in which the diffusion of alkaline ions, and particularly sodium, must be avoided.

We claim:

1. A process for the formation of an aluminum oxide-based coating on a glass substrate and a conductive coating of metallic oxide on said aluminum oxide-based coating, comprising the steps of spraying on the substrate which has been heated to a temperature lower than its melting point at least one aluminum organic compound which decomposes thermally in contact with the heated glass and oxidizes, wherein the at least one aluminum organic compound is in powder form and has at least one alcoholate function or at least one β-diketone function, provided that said at least one aluminum organic compound is mixed with another organometallic compound, also in powder form, capable of forming on the glass substrate, by means of pyrolysis, an oxide of tin, zinc, indium or titanium, in order to produce a mixed layer of aluminum oxide and tin, zinc, indium or titanium oxide on said glass substrate having a refractive index of 1.70–1.85 to form the aluminum oxide-based coating on the glass substrate and, forming a conductive coating of metallic oxide on said aluminum oxide-based coating.

2. A process according to claim 1, wherein the at least one aluminum organic compound is selected from the group consisting of aluminum triisopropylate, aluminum tri-n-butylate, aluminum tri-ter-butylate, aluminum triethylate, or aluminum acetylacetonate.

3. A process according to claim 1, wherein the at least one aluminum organic compound in powder form has a granulometry such that $d_{90}$ is less than 12 μm.

4. A process according to claim 1, wherein the other organometallic compound suitable for formation of the tin, indium, titanium, or zinc oxide is selected from the group consisting of dibutyltin oxide or difluoride, indium acetylacetonate or formate, methyl titanate, titanium acetylacetonate, or zinc acetate or acetylacetonate.

5. A process according to claim 4, wherein the tin, indium, titanium, and zinc compounds in powder form have a granulometry such that $d_{90}$ is less than 21 μm.

6. A process conforming to claim 1, wherein the mixture contains 20% to 90% aluminum compound by weight and from 10% to 80% other metal compounds by weight.

7. A process according to claim 6, wherein the mixture contains from 40% to 90% aluminum compound by weight and from 10% to 60% tin compound by weight.

8. A process according to claim 6, wherein the mixture contains from 40% to 60% zinc compound by weight and from 60% to 40% aluminum compound by weight.

9. A process according to claim 6, wherein the mixture contains from 25% to 40% indium compound by weight and from 60% to 75% aluminum compound by weight.

10. A process according to claim 1, wherein the temperature of the glass is between 500° and 750° C.

11. A process according to claim 1, wherein the glass supporting base moves at a rate of from 3 to 25 m/mn.

12. A process according to claim 1, wherein the conductive layer of metallic oxide is a tin oxide layer doped with fluorine, a layer of indium oxide doped with tin, or a layer of zinc oxide doped with aluminum or indium.

13. A process according to claim 1, wherein the conductive layer is formed immediately after the aluminum oxide-based layer.

14. A process according to claim 13, wherein two distribution nozzles are used, the first for the powder mixture used to form the aluminum oxide-based layer, and the second, for the powder(s) used to form the conductive layer, these two nozzles being positioned above the glass substrate approximately 20 cm apart and at a distance of approximately 10 cm from the surface of the glass substrate.

15. A process according to claim 1 wherein the mixture contains 60–90% by weight of the at least one aluminum organic compound.

16. A process according to claim 1 wherein the other organometallic compound is indium acetylacetonate.

17. A process according to claim 1 wherein the mixture consists of 20% by weight dibutyltin oxide and 80% by weight aluminum triisopropylate.

* * * * *